July 11, 1939. F. C. BEST 2,165,332
MOTOR VEHICLE
Filed June 12, 1936 2 Sheets-Sheet 1
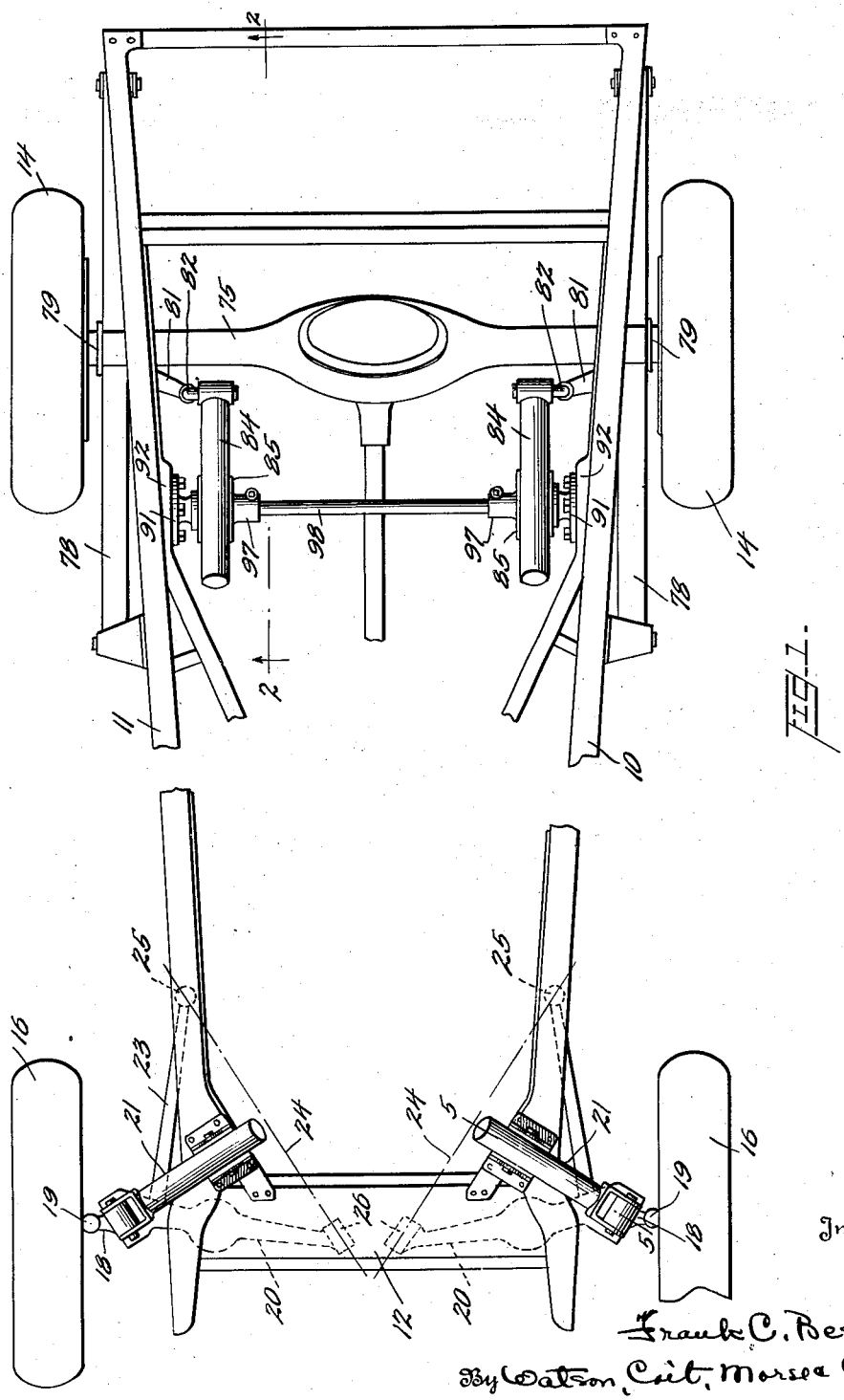
Inventor
Frank C. Best
By Watson, Cait, Morse & Grindle
Attorneys

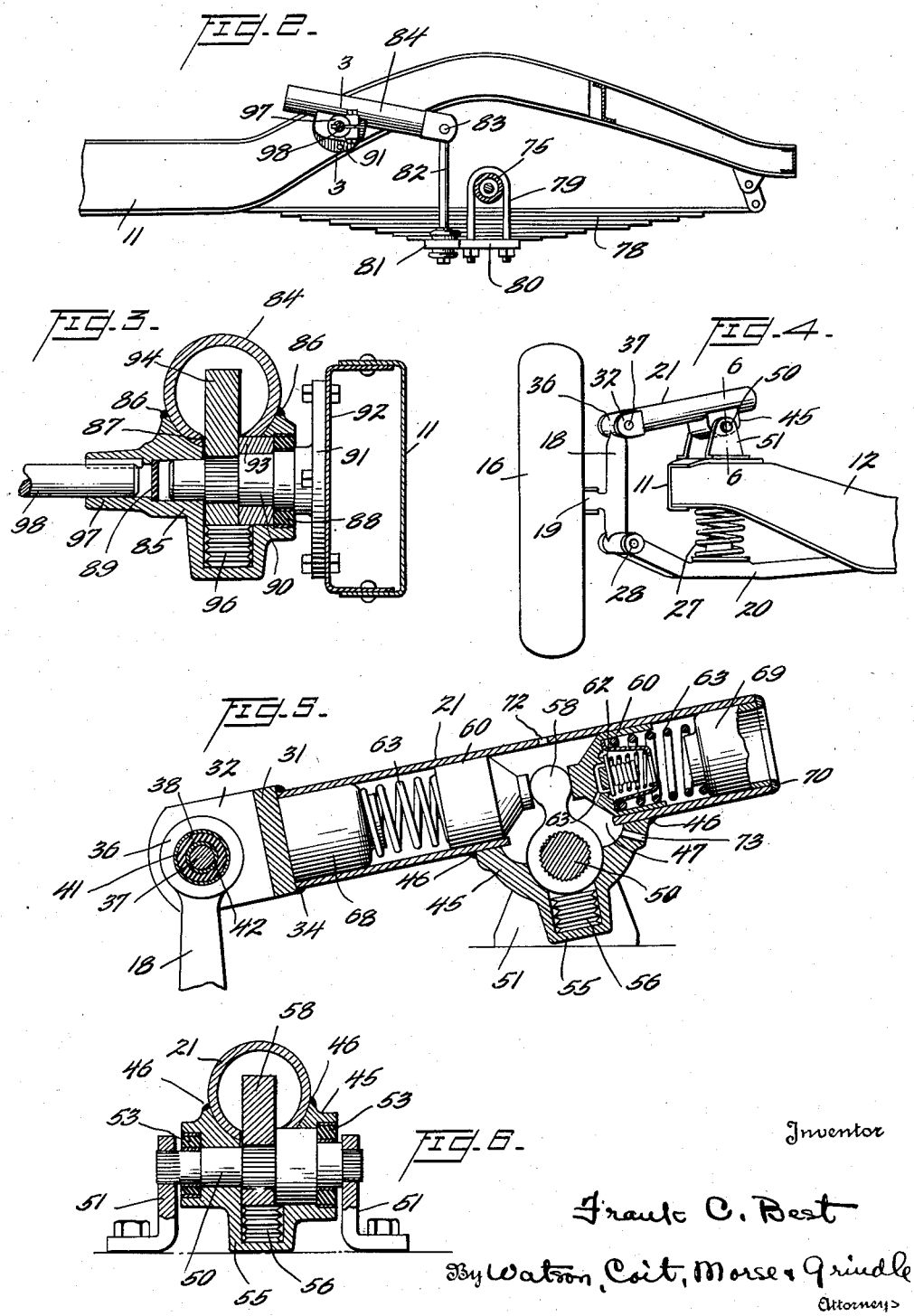

Patented July 11, 1939

2,165,332

UNITED STATES PATENT OFFICE 2,165,332

MOTOR VEHICLE

Frank C. Best, Detroit, Mich., assignor to Packard Motor Car Company, Detroit, Mich., a corporation of Michigan Application June 12, 1936, Serial No. 84,928

3 Claims. (Cl. 267—11)

This invention relates to motor vehicles and is more particularly concerned with mechanism associated with the vehicle wheel suspension, capable of strongly resisting and retarding rapid relative accelerative movement of the road wheels and vehicle frame, and offering much less resistance to gradual or slow relative displacement thereof, such mechanism being referred to herein as shock absorbing mechanism.

As one feature of the invention it is proposed to utilize an element of the wheel suspension as a shock absorbing unit. For example, in the application of the invention to the so-called parallel link type of wheel suspension in which oppositely disposed road wheels are supported for rising and falling movement independently of each other, one or more of the links may be constituted by a shock absorbing device, with resultant economy of space and reduction of manufacturing cost.

It is a further object of the invention to provide a shock absorbing mechanism of general utility which is characterized by extreme simplicity and efficiency in operation, which may be cheaply constructed and quickly assembled, and which will require a minimum of attention and servicing during operation. In the preferred form this shock absorber comprises a cylinder having piston means displaceable therein, the cylinder being supported for rocking movement on the vehicle frame, displacement of the piston means being effected by a fixed abutment. This type of shock absorber lends itself readily to use in connection with parallel link suspensions in the manner hereinbefore described. More specifically, the shock absorber is of the double acting type, being constructed to afford resistance to accelerative movement of the road wheels both in rising and in falling, and employs for this purpose two pistons operating in a single cylinder. The cylinder is so constructed that it may be entirely filled with liquid to the exclusion of gas or air and may be completely sealed so that it requires no attention during the life of the vehicle with which it is associated.

A further object of the invention is the provision in a motor vehicle of shock absorbing devices supported for rocking movement at opposite sides of the vehicle and yieldingly connected so that on movement of one device in a given direction, the other device tends, but is not compelled, to move in the same direction. This arrangement is particularly useful in connection with vehicles employing independent wheel suspension which are often characterized by excessive sway on rounding a curve at high speed, the yielding connection tending to maintain the body in an upright position under such conditions. In the preferred form of the invention fluid shock absorbers of the type including cylinders mounted for rocking movement on the frame are connected by a torsion bar, the connection being preferably effected in the axis of rocking movement of the cylinders, such an arrangement being simple, compact, and efficient.

Further objects and features of the invention will be apparent from the following description taken in connection with the accompanying drawings in which Figure 1 is a plan view of a motor vehicle chassis embodying the principles of the invention;

Figure 2 is a longitudinal sectional view taken substantially on the line 2—2 of Figure 1;

Figure 3 is a sectional view taken on the line 3—3 of Figure 2;

Figure 4 is a partial front elevation of the structure shown in Figure 1;

Figure 5 is a view of a shock absorber comprising a partial section on the line 5—5 of Figure 1; and Figure 6 is a sectional view taken substantially on the line 6—6 of Figure 4.

In order to facilitate an understanding of the invention, reference is made herein to the embodiments thereof selected for the purpose of illustration and shown in the accompanying drawings and specific language is employed to describe the same. It will nevertheless be understood that no limitation of the invention is thereby intended and that various alterations and modifications are contemplated such as would suggest themselves to one skilled in the art. For example, the invention is illustrated in Figure 1 as applied to a vehicle in which the forward steerable road wheels are independently mounted on the frame while the rear driving road wheels employ the more conventional rigid axle. It will be appreciated, however, that the invention is also applicable to vehicles in which all four road wheels are independently suspended or to a vehicle employing the rigid axle type of suspension for all four wheels. It will further be appreciated that the shock absorbing device embodies a number of improvements over devices of the prior art regardless of the nature of the suspension with which it is employed. Furthermore, it will be apparent that a number of the structural details illustrated herein may be varied to a considerable extent without essential alteration of the function performed, and such variation is contemplated.

Referring first to Figure 1, it will be observed that the vehicle frame is represented as comprising side frame members 10 and 11, these members being of channel section and being connected at various points in the length thereof by cross frame members extending between and secured to the side frame members. One of these cross frame members, designated at 12, is disposed adjacent the forward end of the vehicle and is preferably of generally box section, extending between and fitting within the side frame members 10 and 11. The details of the frame structure form no part of the present invention, however, and may be modified as desired. The rear and driving road wheels are indicated at 14 and the forward and steerable road wheels at 16.

The forward road wheels 16 are preferably supported on the frame for independent rising and falling movement with respect thereto, each road wheel being mounted in the conventional manner for steering movement about a generally upright axis on wheel carrying members 18, the members 18, the associated steering knuckles 19, and the road wheels being referred to for convenience herein as road wheel assemblies.

Each road wheel is illustrated as supported on a pair of laterally extending, generally superimposed links, the lower link being indicated at 20 and the upper link at 21, the arrangement being shown more particularly in Figures 1 and 4 of the drawings. Associated with the lower link 20 is a torque arm 23 which is rigidly connected to the link and forms in effect a part thereof, the link 20 and associated torque arm swinging as a unit about an axis 24 which, as will be observed from Figure 1, is inclined at an acute angle with respect to the central, longitudinal, vertical plane of the vehicle frame. Thus the torque arm 23 may be pivoted to the side frame member 11 as at 25 and the link 20 may be pivoted to the cross frame member 12 as at 26, the pivotal connections being preferably of the type employing rubber or other like deformable material and requiring no lubrication, a sheath of rubber being interposed between the relatively moving parts, which rubber is stressed as the link and torque arm rise and fall. At its outer end the lower link is connected to the wheel carrying member 18 as indicated at 28 for pivotal movement about an axis parallel to the inclined axis 24.

The upper link 21 is similarly connected to the frame and to the wheel carrying member for pivotal movement about axes parallel to the axis 24, the effective length of the upper link, that is to say, the distance between the axes of pivotal connection thereof, being shorter than the effective length of the lower link 20, whereby tread variation is minimized and the camber of the road wheel changes as the wheel rises and falls to such an extent as to facilitate steering, particularly when the vehicle rounds a curve. Rising movement of the wheel assembly is yieldingly resisted by means of a coil spring 27 which is interposed under compression between the lower link 20 and the cross frame member 12. The general arrangement of the elements of the suspension as thus far described is that disclosed in the prior application of Clyde R. Paton, Serial No. 702,615, filed December 15, 1933, the instant application being concerned with certain improvements, hereinafter set forth, in this type of suspension. The use of suitable steering mechanism such as shown in the prior application of Paton is contemplated herein.

Each of the upper links 21 is preferably formed as shown more particularly in Figures 5 and 6 to provide a body of generally tubular shape, referred to herein as a cylinder because of its function as such, although it will be appreciated that the body of the link need not be circular in cross-section. Secured to the outer end of the link is a generally U-shaped member having a base portion 31 and apertured ears 32, the base portion of this member being secured to the body of the link 21, for instance by welding as indicated at 34. The wheel carrying member 18 is provided at its upper end with an annular boss 36 through which a pin 37 extends, the pin being secured rigidly in the ears 32. Interposed between the pin 37 and the boss 36 is an annulus 38 of rubber or other deformable material which is interposed between and vulcanized or otherwise surface bonded to sleeves 41 and 42, these sleeves being respectively pressed within and about the boss 36 and pin 37. It will be observed that this construction affords a connection between the link 21 and the wheel carrying member 18 requiring no lubrication, the rubber annulus 38 being stressed on the occurrence of relative rocking movement of these members.

A housing member 45 is secured rigidly to the link 21, for instance by welding as indicated at 46, the tubular body of the link having an opening 47 therein adjacent the member 45 to afford communication with the interior of the housing. Extending through the housing 45 is a supporting shaft 50, the shaft and housing having a journalled relation. The ends of the shaft are secured rigidly, for instance by ribs or splines, within apertures in supporting brackets 51, the latter being in turn secured to the upper side of the adjacent side frame member 10 or 11. The housing 45 is sealed to prevent discharge of fluid therefrom, for example by the employment of annuli 53 of rubber or similar deformable material. These annuli may be vulcanized or otherwise surface bonded to inner and outer sleeves which are respectively received with a press fit on the shaft 50 and within recesses in the lateral faces of the housing 45. Thus on the occurrence of rocking movement of the housing 45 and link 21, the annuli 53 will be stressed, but will at all times form an effective seal, being in effect bonded directly to the two relatively moving parts. It is intended that the link and housing be completely filled with liquid and in order to compensate for expansion of the liquid on increase in temperature, the housing 45 is provided at its lower side with a boss 55 communicating with the interior of the housing and having therein a completely closed collapsible bellows 56 or the like which may contain air. Thus as the liquid expands, the bellows 56 will be partly collapsed to afford the necessary increase in volume in the fluid system.

An arm 58 is secured rigidly to the shaft 50 and thus acts as a fixed abutment, the upper portion of the arm extending into the cylindrical body of the link 21 and being interposed between a pair of oppositely directed pistons 60 which are reciprocable within the link. As shown in Figure 5, each of the pistons 60 is provided with a conventional type of valve indicated generally at 62, this valve permitting free flow of fluid through the passage 63 in the head of the piston, but restricting flow of fluid in the opposite direction to the extent required to offer considerable opposition to rapid accelerative movements of the link 21 about the shaft 50. A coil spring 63 is associated with each piston 60 to maintain the same in contact with the arm 58, these springs acting against abutments in the form of spacing sleeves 68 and 69, the sleeve 69 being secured within the inner end of the link 21, for instance by welding as indicated at 70. Filling openings may be provided in the link 21 and housing 45 respectively so that the system afforded by these members may be completely filled with liquid and all air excluded. This may be readily effected by immersing the link and housing in a suitable liquid, rocking the same to and fro about the link axis with resultant displacement of the pistons until air is completely discharged through the opening 72, and plugging or otherwise sealing both filling openings 72 and 73.

The mode of operation of the structure just described will be apparent. As either of the road wheels 16 rises and falls with respect to the vehicle frame, the associated links 20 and 21 will swing about their points of pivotal connection to the vehicle frame. Rising movement of the road wheel is yieldingly resisted by the spring 27 and rapid accelerative movements in either direction are resisted by the displacement of the pistons 60 within the upper link, one of these pistons acting on compression of the spring 27, or rising movement of the associated wheel, and the other acting on rebound or falling movement of the associated wheel with respect to the frame. By reason of the utilization of the upper link 21 as a shock absorber, the expense of employing additional shock absorbing mechanism is saved and considerable economy of space is effected.

Referring now to the structure at the rear of the vehicle, illustrated in Figures 1, 2, and 3, it will be observed that the conventional rigid axle 75 is employed, road wheels 14 being mounted thereon in the usual manner and being driven from mechanism including differential gearing within the axle housing. The axle may be connected to the vehicle frame at each side of the latter by means of leaf springs 78 which are in turn secured to the vehicle frame, bolts 79 and spring clips 80 being employed to secure the springs to the axle. Each spring clip 80 may be provided with an inwardly directed arm 81 to which is connected a link 82, the latter being pivoted as at 83 to a shock absorber 84, this shock absorber being preferably constructed in essentially the same manner as the shock absorber shown in Figures 5 and 6 and hereinbefore described. Thus the body of the shock absorber is of generally tubular shape and functions as a cylinder. A housing member 85 is secured rigidly thereto, for instance by welding as indicated at 86, the cylinder having an opening 87 therein adjacent the member 45 to afford communication with the interior of the housing. A shaft 90 extends within the housing and is provided exteriorly thereof with a flanged portion 91, the latter being in turn secured to a reinforcing element 92 of channel section fitting within and rigid with the adjacent side frame member 10 or 11. A spacing member 93 may surround the shaft 90 or, alternatively, this spacing member may form an integral part of the housing 85.

An arm 94 is secured rigidly to the shaft 90, and thus acts as a fixed abutment, the upper portion of the arm extending into the cylindrical body of the shock absorber and being interposed between a pair of oppositely directed pistons which are constructed and function similarly to the pistons shown in Figure 5 of the drawings. A bellows 96 is provided to compensate for expansion of liquid within the shock absorber as hereinbefore explained.

Each housing member 85 is provided adjacent its inner end with a sleeve portion 97, and a torsion bar 98 extends within and is splined or otherwise secured against rotation with respect to the sleeve portions 97 at opposite sides of the vehicle. This bar may be made of metal and is sufficiently elastic to permit the road wheels to rise and fall with respect to the frame in the normal manner in passing over an irregular road bed. When the vehicle rounds a curve at high speed, and the body tends to lean, such tendency is resisted and overcome at least in part by the action of the bar which urges one of the oppositely disposed shock absorbers to follow the other.

As in the previously described construction, the cylinder 84 and housing 85 form a unitary casing which may be completely sealed to provide a fluid-tight system. Thus an annulus 88 of rubber or other deformable material may be surface bonded to the housing 85 and shaft 90 adjacent the point of entry of the latter into the housing, and a plug 89 may be pressed within the opening afforded by the sleeve portion 97.

It will be appreciated that this arrangement affords an extremely simple and direct connection between the road wheel assemblies at the opposite sides of the vehicle which is useful for the stabilization of independently suspended wheels as well as those mounted on the more conventional rigid axle, it being a simple matter to operatively connect each shock absorber with one of the moving parts of the suspension for the associated road wheel.

The assembly of the shock absorber shown herein is preferably carried out in the following manner, reference being made to Figures 5 and 6. The cylinder 21 is first welded to the housing 45, the latter having been partially machined. The machining of the housing is then completed and the cylinder is broached or reamed to provide an accurate fit for the pistons. The base 31 of the element affording the pivotal connection to the wheel carrying member 18 is now welded to the cylinder, the point of weld being sufficiently far removed from the point of extreme piston travel to avoid any improper fit as the result of warping of the cylinder wall.

The bellows 56 is then inserted through the open end of the cylinder and the spacing sleeve 68, the spring 65, the left-hand piston 60, the arm 58, and the shaft 50 are installed in the order named. The annular rubber seals 53 at each end of the shaft 50 are now pressed in position, the remaining piston 60 installed, and the spacing sleeve 69 inserted and welded in position, it being noted that the weld is again sufficiently removed from the range of displacement of the pistons to avoid damaging the cylinder by warping.

The unit as thus assembled is immersed in a tank of oil at normal operating temperature, being preferably inserted in a fixture which grips the projecting ends of the shaft 50, so that the cylinder may be rocked up and down during immersion to move the pistons back and forth and thereby discharge all air through the openings 72 at the upper side of the cylinder. When all the air has been evacuated the openings 72 and 73 are plugged and may be soldered or welded to avoid leakage.

It will be appreciated that owing to the hermetic sealing of the unit no servicing of any kind will be required on the shock absorber during the life of the car. Thus fluid cannot work out and dirt and abrasives are excluded. This is a very decided improvement over shock absorbers in common use today which are prone to leak, particularly at the ends of the cylinders where high fluid pressure is applied. Since all air is evacuated at assembly, the oil or other liquid cannot be emulsified and the efficiency and uniformity of action of the shock absorber is accordingly improved.

By the employment of the instant invention it is possible to secure precise uniformity of operation of all four shock absorbers on a vehicle, a condition which is practically impossible to maintain in practice with more conventional types of shock absorber owing to the different conditions of wear and uneven leakage of fluid, and a balanced and stable control of riding conditions is thus ensured.

Having thus described the invention, what is claimed as new and desired to be secured by Letters Patent is:

1. In a shock absorber for motor vehicles, the combination with a fluid-tight, permanently sealed casing including a cylinder, of piston means operable in said cylinder, a stationary shaft extending into said casing, said casing being oscillatable on said shaft, said shaft having means thereon engaging said piston means to operate the latter on rocking movement of said cylinder, means sealing said casing at the point of entry of said shaft therein, and means associated with said casing and deformable under pressure to increase the volume of the casing, whereby said casing may be completely filled with liquid and compensation for increase in temperature automatically effected, said last named means comprising a collapsible chamber in said casing outside of the head end of said cylinder.

2. In a fluid shock absorber for motor vehicles, the combination with an elongated cylinder, of closure members welded to the ends of the cylinder, and piston means supported for extreme displacement in said cylinder between points in the length thereof substantially removed from the ends of the cylinder and the welded zone, whereby warping of the cylinder by heating during welding will not adversely affect that portion of the cylinder in which said piston means is movable.

3. In a fluid shock absorber for motor vehicles, the combination with an elongated cylinder, of closure members welded to the ends of the cylinder, piston means supported for extreme displacement in said cylinder between points in the length thereof substantially removed from the ends of the cylinder and the welded zone, whereby warping of the cylinder by heating during welding will not adversely affect that portion of the cylinder in which said piston means is movable, and coil springs acting against said piston means, said closure members extending within said cylinder and constituting abutments for engagement by said springs.

FRANK C. BEST.